(12) United States Patent
Lim et al.

(10) Patent No.: US 11,183,697 B2
(45) Date of Patent: Nov. 23, 2021

(54) SEPARATOR FOR A FUEL CELL INCLUDING A FIRST SEPARATOR PLATE REGULATING AN ASSEMBLY POSITION OF A SECOND SEPARATOR PLATE

(71) Applicants: HYUNDAI MOTOR COMPANY, Seoul (KR); KIA MOTORS CORPORATION, Seoul (KR)

(72) Inventors: Soo Jin Lim, Seongnam-si (KR); Byeong-Heon Jeong, Yongin-si (KR); Seong Il Heo, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 153 days.

(21) Appl. No.: 16/518,693

(22) Filed: Jul. 22, 2019

(65) Prior Publication Data
US 2019/0341632 A1   Nov. 7, 2019

Related U.S. Application Data

(62) Division of application No. 15/636,769, filed on Jun. 29, 2017, now Pat. No. 10,403,907.

(30) Foreign Application Priority Data

Dec. 15, 2016   (KR) .................. 10-2016-0171603

(51) Int. Cl.
| H01M 8/0247 | (2016.01) |
| H01M 8/0267 | (2016.01) |
| H01M 8/0276 | (2016.01) |

(52) U.S. Cl.
CPC ....... *H01M 8/0247* (2013.01); *H01M 8/0267* (2013.01); *H01M 8/0276* (2013.01); *Y02P 70/50* (2015.11)

(58) Field of Classification Search
CPC . H01M 8/0247; H01M 8/0267; H01M 8/0276
(Continued)

(56) References Cited

U.S. PATENT DOCUMENTS

2004/0168910 A1*  9/2004  Andrews ............. H01M 8/0247
                                                         204/242
2009/0023026 A1   1/2009  Chin
(Continued)

FOREIGN PATENT DOCUMENTS

JP   2007172992   7/2007
KR   101601408 B1   3/2016

*Primary Examiner* — Sean P Cullen
(74) *Attorney, Agent, or Firm* — Lempia Summerfield Katz LLC

(57) ABSTRACT

A fuel cell separator includes a first separator plate and a second separator plate for an anode or a cathode. The first and second separator plates are adjacent to each other for assembly in a fuel cell stack. A first protrusion is formed at an edge portion of the first separator plate and protrudes toward the second separator plate arranged facing the first separator plate. A second protrusion is formed at an edge portion of the second separator plate and protrudes toward the first separator plate arranged facing the second separator plate. With the first and second separator plates adjacent to each other, since side surfaces of the first and second protrusions push each other, assembly positions of the first and second separator plates are regulated. The first and second protrusions are arranged such that opposing side surfaces thereof are spaced from each other. A third gasket is arranged in a gap between the first and second protrusions.

11 Claims, 4 Drawing Sheets

(58) Field of Classification Search
USPC .......................................................... 429/512
See application file for complete search history.

(56) References Cited

U.S. PATENT DOCUMENTS

| | | |
|---|---|---|
| 2009/0239128 A1 | 9/2009 | Keyser et al. |
| 2009/0280391 A1* | 11/2009 | Chang .................. H01M 8/242 |
| | | 429/515 |
| 2010/0015502 A1 | 1/2010 | Jiang |
| 2014/0147768 A1 | 5/2014 | Beille |
| 2014/0197605 A1 | 7/2014 | Shimazoe |
| 2015/0303495 A1 | 10/2015 | Heo |

* cited by examiner

SEPARATOR FOR A FUEL CELL INCLUDING A FIRST SEPARATOR PLATE REGULATING AN ASSEMBLY POSITION OF A SECOND SEPARATOR PLATE

CROSS REFERENCE TO RELATED APPLICATION

This application is a division of U.S. patent application Ser. No. 15/636,769 entitled "SEPARATOR FOR A FUEL CELL", filed Jun. 29, 2017, which claims priority to and the benefit of Korean Patent Application No. 10-2016-0171603 filed in the Korean Intellectual Property Office on Dec. 15, 2016. The entire contents of these prior filed applications are incorporated herein by reference.

BACKGROUND

Technical Field

The present disclosure relates to fuel cells, and more particularly to a separator for a fuel cell.

Background Art

A polymer electrolyte membrane fuel cell (PEMFC, hereinafter, simply referred to as a fuel cell) stack includes a plurality of unit cells that are stacked on each other. Each unit cell includes a membrane electrolyte assembly (MEA), gas diffusion layers, separators, and gaskets. Simplification and unification of components of a fuel cell stack are required to save costs, facilitate assembling of a stack, and improve productivity.

A conventional fuel cell stack features a structure in which first-type separator plates are each provided with a gasket on one side thereof and are produced through single-side injection molding, and in which second-type separator plates are each provided with gaskets on both sides thereof and are produced through double-side injection molding. The first-type separator plates and second-type separator plates are alternately stacked on each other. The conventional technology has a drawback that a conventional separator is thick so as not to be deformed when undergoing double-side injection molding. Moreover, when unifying anode and cathode separators, spot welding is performed in four corners of the anode and cathode separators. During this process, misalignment of the separators may occur and assembly defects may be generated.

The foregoing is intended merely to aid in the understanding of the background of the present disclosure. The foregoing is not intended to mean that the present disclosure falls within the purview of the related art that is already known to those skilled in the art.

SUMMARY

Accordingly, the present disclosure is provided, keeping in mind the above problems occurring in the prior art. An object of the present disclosure is to provide a separator for a fuel cell, the separator solving a problem of a conventional separator. In a conventional separator, two kinds of separators having different thicknesses are used due to double-side gasket molding. This reduces misalignment when a pair of separators is stacked and assembled with each other and increases production efficiency by enabling self-alignment.

In order to accomplish the above object, the present disclosure provides a separator for a fuel cell. The separator includes a first separator plate and a second separator plate for an anode or a cathode, the first separator plate and the second separator plate being adjacent to each other for assembly in a fuel cell stack. The separator also includes a first protrusion formed at an edge portion of the first separator plate and protruding toward the second separator plate arranged facing the first separator plate. The separator further includes a second protrusion formed at an edge portion of the second separator plate and protruding toward the first separator plate arranged facing the second separator plate. With the first separator plate and the second separator plate adjacent to each other, since side surfaces of the first protrusion and the second protrusion push each other, assembly positions of the first separator plate and the second separator plate are regulated.

The second protrusion may be arranged inside or inward of the first protrusion and thus may be nearer a center of a fuel cell than the first protrusion.

The separator may further include a first gasket combined with a surface of the first separator plate, the surface of the first separator plate not facing the second separator plate, at a position corresponding to the first protrusion. The separator may also include a second gasket combined with a surface of the second separator plate, the surface of the second separator plate not facing the first separator plate, at a position corresponding to the second protrusion.

In the separator, a highest end of the first protrusion may support the second separator plate and a highest end of the second protrusion may support the first separator plate.

In the separator, a highest end of the first protrusion may be fixed to the second separator plate and a highest end of the second protrusion may be fixed to the first separator plate.

The highest ends of the first protrusion and the second protrusion may have a flat surface and the flat surfaces may support the second separator plate and the first separator plate.

The first protrusion and the second protrusion may have a first cavity and a second cavity, respectively. A first gasket and a second gasket may be formed to fill the first cavity and the second cavity, respectively.

In the separator, each of the first gasket and the second gasket may include a base in contact with a surface of the corresponding first separator plate and second separator plate, respectively, a filling portion inserted in the corresponding first cavity and second cavity, respectively, and a main protrusion formed protruding in an opposite direction of the filling portion.

In the separator, an auxiliary protrusion may be formed on the base of the first gasket or the second gasket, may be positioned next to the main protrusion, and may protrude in the same direction as the main protrusion.

The auxiliary protrusion of the first gasket may be formed at a position corresponding to the second protrusion of the second separator plate and the auxiliary protrusion of the second gasket may be formed at a position corresponding to the first protrusion of the first separator plate.

The main protrusion and the auxiliary protrusion may have the same height.

The first protrusion and the second protrusion may be arranged such that opposing side surfaces of the first protrusion and the second protrusion are in contact with each other.

The first protrusion and the second protrusion may be arranged such that opposing side surfaces of the first protrusion and the second protrusion are spaced from each other. A third gasket may be arranged in a gap between the first protrusion and the second protrusion.

The third gasket may support the opposing side surfaces of the first protrusion and the second protrusion in a sideways direction.

The first protrusion and the second protrusion may be provided with a first cavity and a second cavity, respectively. The first cavity and the second cavity may be filled with the first gasket and the second gasket, respectively. Opposing side walls of the first protrusion and the second protrusion may be provided with respective through holes. The first gasket and the second gasket in the first cavity and the second cavity may be connected to each other via the through holes.

In the separator, cooling water may flow between the first separator plate and the second separator plate.

The separator for a fuel cell according to the present disclosure solves a conventional problem that two kinds of separator plates having different thicknesses are used due to double-side gasket injection molding, reduces misalignment during stacking and unifying a pair of separator plates, and improves production efficiency by adopting a self-aligning structure.

The present disclosure has advantages described below. First, since separator plates with the same thickness are used for a separator for a fuel cell, the number of manufacturing processes and costs are reduced. Second, since the thickness of the separator plates is reduced, the size and weight of a fuel cell stack can be decreased. Third, since the separator for a fuel cell has a self-aligning structure, assembly of the separator for a fuel cell is facilitated and alignment between anode and cathode separators is improved. This results in an improvement in quality and production efficiency (reduction in manufacturing defects) of a separator for a fuel cell.

DETAILED DESCRIPTION

Figure 1:
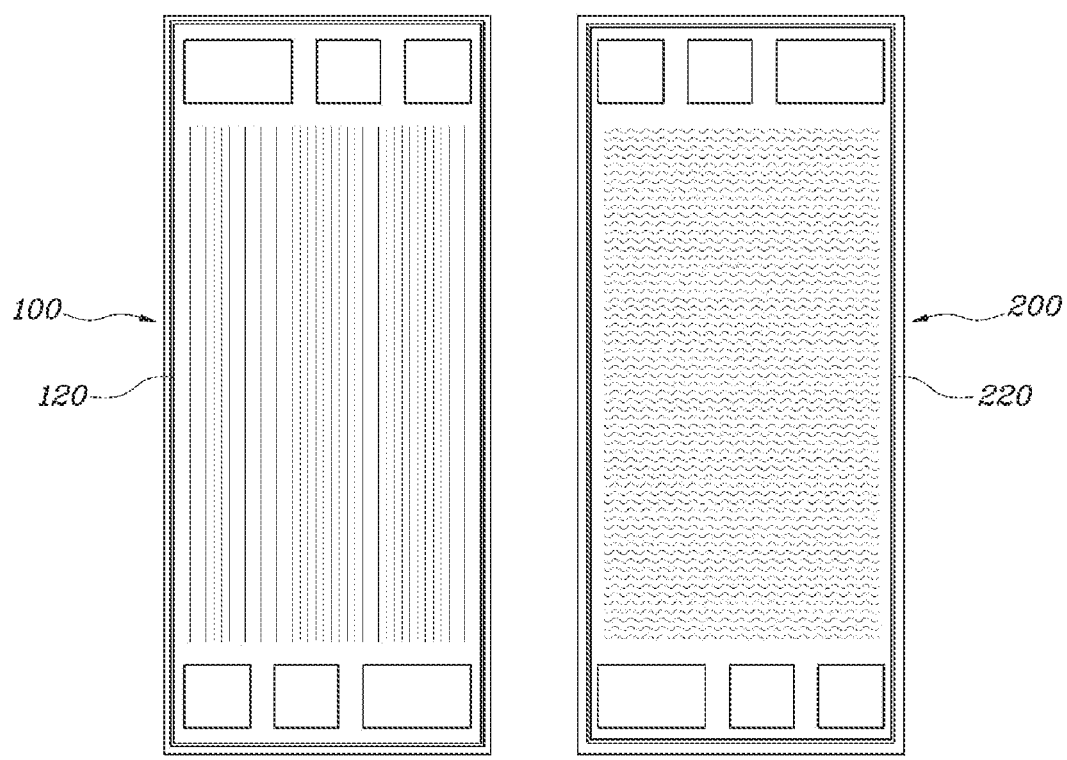
FIG. 1 is a diagram illustrating an unassembled state of a separator for a fuel cell according to one embodiment of the present disclosure.
Figure 2:
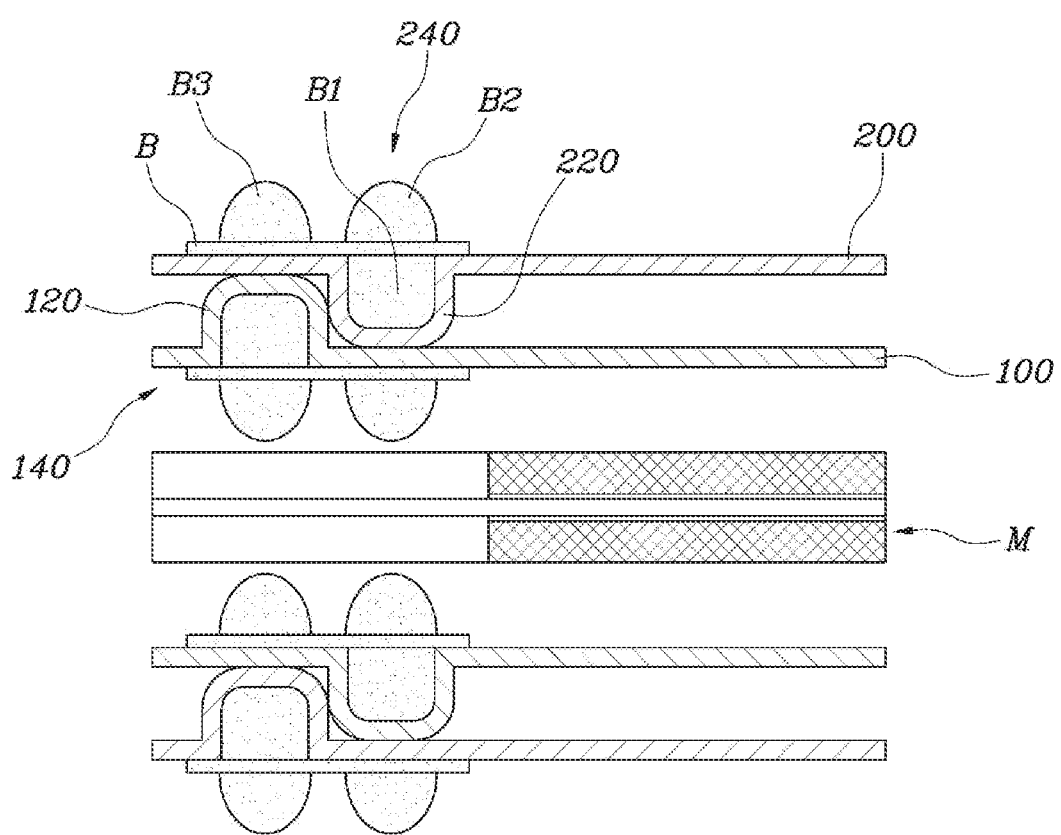
FIG. 2 is a diagram illustrating an assembled state of a separator for a fuel cell according to a first embodiment of the present disclosure.
Figure 3:
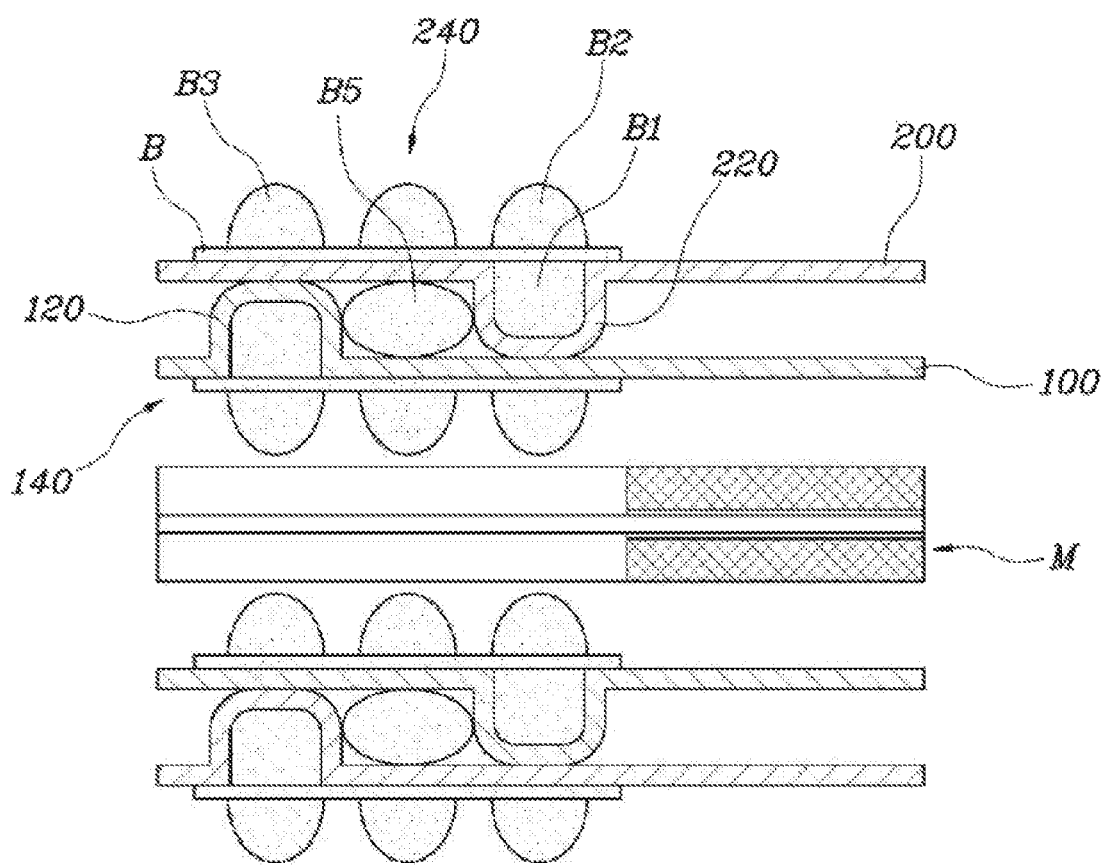
FIG. 3 is a diagram illustrating an assembled state of a separator for a fuel cell according to a second embodiment of the present disclosure.
Figure 4:
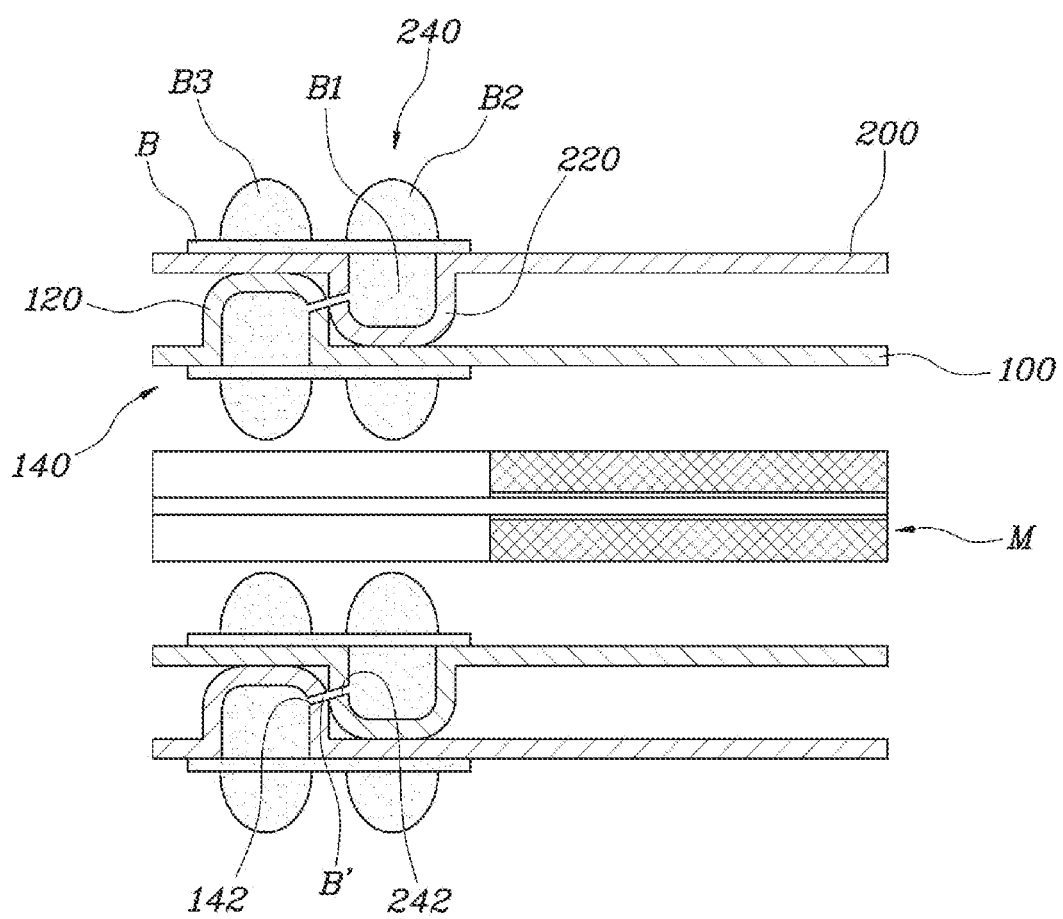
FIG. 4 is a diagram illustrating an assembled state of a separator for a fuel cell according to a third embodiment of the present disclosure.

FIG. 1 is a diagram illustrating an unassembled state of a separator for a fuel cell according to one embodiment of the present disclosure. FIG. 2 is a diagram illustrating an assembled state of a separator for a fuel cell according to a first embodiment of the present disclosure. FIG. 3 is a diagram illustrating an assembled state of a separator for a fuel cell according to a second embodiment of the present disclosure. FIG. 4 is a diagram illustrating an assembled state of a separator for a fuel cell according to a third embodiment of the present disclosure.

According to the present disclosure, a separator for a fuel cell includes a first separator plate 100 and a second separator plate 200 for an anode or a cathode. The plates are adjacent to each other when a fuel cell stack is assembled. A first protrusion 120 is formed at an edge portion of the first separator plate 100 and protrudes toward the second separator plate 200. A second protrusion 220 is formed at an edge portion of the second separator plate 200 and protrudes toward the first separator plate 100. When the first separator plate 100 and the second separator plate 200 are combined with each other, opposing side surfaces of the first protrusion 120 and the second protrusion 220 are in tight contact with each other, which naturally regulates the assembled positions of the first separator plate 100 and the second separator plate 200 in a lateral direction.

FIG. 1 shows an unassembled state of a separator for a fuel cell according to one embodiment of the present disclosure. The separator for a fuel cell roughly includes the first separator plate 100 and the second separator plate 200. Each separator plate 100 or 200 is provided with a manifold. The separator plates are combined with a reactive layer M that is a combined structure of a Membrane Electrolyte Assembly (MEA) and a Gas Diffusion Layer (GDL).

As illustrated in FIG. 1, in a separator for a fuel cell including an anode and a cathode, each separator plate is provided with a protrusion. The separator plates are self-aligning due to the protrusions that are engaged to be next to each other in a lateral direction.

As to the first separator plate 100 and the second separator plate 200 for an anode or a cathode, the first protrusion 120 is formed at an edge portion of the first separator plate 100 and protrudes toward the second separator plate 200. The second protrusion 220 is formed at an edge portion of the second separator plate 200 and protrudes toward the first separator plate 100. The second protrusion 220 is arranged to be closer to the center of a fuel cell than inside the first protrusion 120. In other words, the second protrusion 220 is arranged inside or further inward of the first protrusion 120 relative to the center of the fuel cell.

FIG. 2 is a cross-sectional view of an assembled state of a separator for a fuel cell according to a first embodiment of the present disclosure. Opposing side surfaces of the first protrusion 120 and the second protrusion 220 can be in contact with each other. With reference to FIG. 1, the first protrusion 120 and the second protrusion 220 have an overall rectangular frame shape. The second protrusion 220 is arranged inside the first protrusion 120 when a separator for a fuel cell is assembled. The opposing side surfaces of the first protrusion 120 and the second protrusion 220 are in contact with each other, thereby supporting each other in a sideways direction. In other words, the assembled positions of the first separator plate 100 and the second separator plate 200 are regulated in a press-fit connection manner. Therefore, when assembled, the first separator plate 100 and the second separator plate 200 are self-aligned with each other. Cooling water can flow between the first separator plate 100 and the second separator plate 200. The first protrusion 120 and the second protrusion 220 function to seal the cooling water by use of a mutually supporting structure so that the water does not leak.

Specifically, a highest end of the first protrusion 120 supports the second separator plate 200 and a highest end of the second protrusion 220 supports the first separator plate 100. This structure regulates both lateral and vertical positions of the first separator plate 100 and the second separator plate 200. The highest end of the first protrusion 120 is fixed to the second separator plate 200 and the highest end of the second protrusion 220 is fixed to the first separator plate 100, for example, through welding or bonding. Specifically, the first separator plate 100 and the second separator plate 200 are first positioned not to be displaced at an initial assembly stage. Then the first separator plate 100 and the second separator plate 200 are securely fixed through a proper process, such as by for example, welding. In addition, the highest ends of the first protrusion 120 and the second protrusion 220 have a flat surface. Therefore, the first separator plate 100 and the second separator plate 200 can be supported on the flat surfaces. In other words, due to the flat surfaces of the highest ends, the first separator plate 100 and the second separator plate 200 can be stably supported.

As shown in FIG. 2, the separator for a fuel cell further includes a first gasket 140 combined with a surface of the first separator plate 100 at a position corresponding to the first protrusion 120. The surface of the first separator plate is not facing the second separator plate 200. The separator also includes a second gasket 240 combined with a surface of the second separator plate 200 at a position corresponding to the second protrusion 220. The surface of the second separator plate is not facing the first separator plate 100.

FIG. 2 is a cross-sectional view of the assembled state of the separator for a fuel cell according to the first embodiment of the present disclosure. Specifically, the first protrusion 120 and the second protrusion 220 have a first cavity and a second cavity, respectively. The first gasket 140 and the second gasket 240 may be formed in the first cavity and the second cavity, respectively. Therefore, with the use of only the protrusions, it is possible to regulate assembled positions of the separator plates and to stably maintain secure sealing. Since the first gasket 140 and the second gasket 240 are filled or disposed in the first cavity and the second cavity, respectively, positions of each component part are securely maintained.

The first gasket 140 or the second gasket 240 includes a base B in contact with the surface of the corresponding separator plate, a filling portion B1 inserted in the corresponding cavity, and a main protrusion B2 that protrudes from the surface of the filling portion B1 in the opposite direction of the filling portion B1. The first gasket 140 or the second gasket 240 may further include an auxiliary protrusion B3 that is arranged next to the main protrusion B2 and that protrudes from the base B in the same direction as the main protrusion B2. The position of the main protrusion B2 is maintained due to the filling portion B1, and the main protrusion B2 provides perfect sealing in combination with the auxiliary protrusion B3. The base B, the filling portion B1, the main protrusion B2, and the auxiliary protrusion B3 are made of the same material and are integrally formed through injection molding that is performed in a state in which the separator plate is inserted in the mold.

Specifically, the auxiliary protrusion B3 of the first gasket 140 may be formed at a position corresponding to the second protrusion 220 of the second separator plate 200. Likewise, the auxiliary protrusion B3 of the second gasket 240 may be formed at a position corresponding to the first protrusion 120 of the first separator plate 100. The auxiliary protrusion B3 forms a double-sealing structure in combination with the main protrusion B2 and provides an upward supporting function in combination with the main protrusion B2, thereby forming a dynamically strong supporting structure in a fuel cell. In addition, since the heights of the main protrusion B2 and the auxiliary protrusion B3 are the same as each other, a uniform compression load is applied to the main protrusion B2 and the auxiliary protrusion B3 in a vertical direction. Therefore, the main protrusion B2 and the auxiliary protrusion B3 are load balanced, which prevents concentration of stress, thereby ensuring high durability of a sealing structure of a fuel cell.

FIG. 3 is a cross-sectional view illustrating an assembled state of a separator for a fuel cell according to a second embodiment of the present disclosure. Opposing side surfaces of the first protrusion 120 and the second protrusion 220 are spaced from each other. A third gasket B5 is arranged in a gap within the spacing between the first protrusion 120 and the second protrusion 220. The third gasket B5 pushes the side surfaces of the first protrusion 120 and the second protrusion 220 in a sideways direction. In this embodiment, an O-ring gasket is inserted between cooling surfaces of the first and second protrusions 120, 220 of the first and second separator plates 100, 200, thereby increasing strength and sealing performance of a separator for a fuel cell. In addition, since a slight positioning error (tolerance) usually occurs in positioning during assembly, the third gasket B5 functions to absorb and eliminate the positioning error.

FIG. 4 is a cross-sectional view illustrating an assembled state of a separator for a fuel cell according to a third embodiment of the present disclosure. The first protrusion 120 and the second protrusion 220 are provided with a first cavity and a second cavity, respectively. The first cavity and the second cavity are filled with the first gasket 140 and the second gasket 240, respectively. Opposing side walls of the first protrusion 120 and the second protrusion 220 are provided with respective through holes 142 and 242 at positions corresponding to each other. The first gasket 140 and the second gasket 240 in the first cavity and the second cavity are connected to each other by a connection strip B' extending through the through holes 142 and 242. In this embodiment, the protrusions 120, 220 of the separator plates 100, 200 are provided with a piercing hole. A gasket material is charged into the cavities of the protrusions so that the gaskets 140, 240 can be formed in the cavities. According to this embodiment, it is possible to improve strength and sealing performance of a stack structure. Due to this structure, although eccentric force is applied, since the first gasket 140 and the second gasket 240 are pulling each other, sealing performance is not deteriorated.

The separator for a fuel cell according to the present disclosure can solve a problem of a conventional separator for a fuel cell in which two kinds of separator plates having different thicknesses are used due to double-side injection molding. In addition, the separator according to the present disclosure can reduce misalignment of separator plates when the separator plates are stacked and assembled. Further, the separator according to the present disclosure increases production efficiency by using a self-aligning structure.

The present disclosure has the following advantages. With the use of separator plates having the same thickness, the number of manufacturing processes and the cost of a separator for a fuel cell can be reduced. With the use of separator plates having a reduced thickness, a fuel cell stack with a reduced size and weight can be provided. Due to the self-alignment structure, assembly of a separator for a fuel cell is facilitated. Due to precise alignment between anode or cathode separator plates, quality and production efficiency (reduction of manufacturing defects) of a separator for a fuel cell are improved.

Although preferred embodiments of the present disclosure have been described for illustrative purposes, those having ordinary skill in the art will appreciate that various modifications, additions and substitutions are possible, without departing from the scope and spirit of the disclosure as set forth in the accompanying claims.

What is claimed is:

1. A separator for a fuel cell, the separator comprising:
a first separator plate and a second separator plate for an anode or a cathode, the first separator plate and the second separator plate being adjacent to each other for assembly in a fuel cell stack;

a first protrusion formed at an edge portion of the first separator plate and protruding toward the second separator plate arranged facing the first separator plate;

a second protrusion formed at an edge portion of the second separator plate and protruding toward the first separator plate arranged facing the second separator plate;

a first gasket combined with a surface of the first separator plate, the surface of the first separator plate not facing the second separator plate, at a formation position of the first protrusion; and a second gasket combined with a surface of the second separator plate, the surface of the second separator plate not facing the first separator plate, at a formation position of the second protrusion, wherein, with the first separator plate and the second separator plate adjacent to each other, since side surfaces of the first protrusion and the second protrusion push each other, assembly positions of the first separator plate and the second separator plate are regulated, wherein the first protrusion and the second protrusion are arranged such that the side surfaces of the first protrusion and the second protrusion are spaced from each other, wherein a third gasket is arranged in a gap between the first protrusion and the second protrusion, wherein each of the first gasket and the second gasket includes a base in contact with the surface of each of the first separator plate and the second separator plate, wherein a filling portion of the first gasket is inserted in a first cavity of the first protrusion and a filling portion of the second gasket is inserted in a second cavity of the second protrusion, and wherein each of the first gasket and the second gasket includes a main protrusion formed protruding in an opposite direction of the filling portion of the first gasket and the second gasket, respectively.

2. The separator according to claim 1, wherein the second protrusion is arranged inward of the first protrusion and thus is nearer a center of the fuel cell than the first protrusion.

3. The separator according to claim 1, wherein a top end of the first protrusion supports the second separator plate, and a top end of the second protrusion supports the first separator plate.

4. The separator according to claim 1, wherein a top end of the first protrusion is fixed to the second separator plate, and a top end of the second protrusion is fixed to the first separator plate.

5. The separator according to claim 1, wherein top ends of the first protrusion and the second protrusion each have a flat surface, and wherein the flat surfaces support the second separator plate and the first separator plate, respectively.

6. The separator according to claim 1, wherein the first gasket and the second gasket are formed to fill the first cavity and the second cavity, respectively.

7. The separator according to claim 1, wherein the third gasket supports the side surfaces of the first protrusion and the second protrusion in a sideways direction.

8. The separator according to claim 7, wherein an upper surface or a lower surface of the third gasket contact with at least one of the first separator plate and the second separator plate.

9. The separator according to claim 1, wherein an auxiliary protrusion is formed on the base of the first gasket or the second gasket, is positioned next to the main protrusion, and protrudes in the same direction as the main protrusion.

10. The separator according to claim 9, wherein the auxiliary protrusion of the first gasket is formed at a stack position, which is the same as the second protrusion of the second separator plate in a stack direction of the first separator plate and the second separator plate, and wherein the auxiliary protrusion of the second gasket is formed at a stack position, which is the same as the first protrusion of the first separator plate in the stack direction.

11. The separator according to claim 9, wherein the main protrusion and the auxiliary protrusion have the same height.

* * * * *